United States Patent [19]

Bascou

[11] Patent Number: 4,691,581
[45] Date of Patent: Sep. 8, 1987

[54] GEARMOTOR FOR THE ALTERNATE DRIVE OF TWO OPERATIONS

[75] Inventor: Jacques Bascou, Maule, France

[73] Assignee: Regie Nationale des Usines Renault, Paris, France

[21] Appl. No.: 804,768

[22] Filed: Dec. 5, 1985

[51] Int. Cl.[4] ............ F16H 19/04; E05F 11/48
[52] U.S. Cl. ............ 74/30; 74/471 R; 49/352
[58] Field of Search ........ 74/30, 471 R, 501 R, 74/31, 37, 29, 665 F; 474/6, 5, 119; 49/352, 349, 374; 254/407, 408, 389, 390

[56] References Cited

U.S. PATENT DOCUMENTS

| | | | |
|---|---|---|---|
| 2,943,514 | 7/1960 | Golde | 74/501 R |
| 2,962,772 | 12/1960 | Draving et al. | 74/37 |
| 2,985,483 | 5/1961 | Bishop et al. | 74/501 R |
| 3,280,509 | 10/1966 | Werner | 74/665 F |
| 3,575,057 | 4/1971 | Kurowski | 74/30 |
| 4,211,122 | 7/1980 | Hess et al. | 74/501 R |
| 4,570,617 | 2/1986 | Baus | 74/31 |
| 4,614,009 | 9/1986 | Boots | 74/501 R |

FOREIGN PATENT DOCUMENTS 495424 11/1938 United Kingdom ............ 74/501 R

Primary Examiner—Cornelius J. Husar
Assistant Examiner—Peter M. Cuomo
Attorney, Agent, or Firm—Oblon, Fisher, Spivak, McClelland, & Maier

[57] ABSTRACT

A gearmotor for the alternate drive of two operations has a housing which receives a drive pinion, mounted on the output shaft of the reduction gear. The drive pinion is able to engage alternately with a first rack cable A and a second rack cable B, both mounted parallel in a sliding guide that can move in the housing in a plane perpendicular to the shaft of the drive pinion between two end positions in each of which one of the two cables is engaged with the drive pinion while the other cable is in a disengaged position. A device is provided for actuating the sliding guide. Application is particularly for electrical equipment of a motor vehicle side door.

6 Claims, 6 Drawing Figures

4,691,581

GEARMOTOR FOR THE ALTERNATE DRIVE OF TWO OPERATIONS

BACKGROUND OF THE INVENTION

1. Field of the Invention

This invention relates to a gearmotor having an electric motor to alternately provide the motorized drive control of two operations.

2. Discussion of the Background

The side doors of motor vehicles have various mechanisms, for example a window crank or a lock, which are driven by an electric booster. This tendency to electrically drive mechanical devices aims to eliminate effort to operate these mechanisms.

This electric driving for various operations naturally requires a motorization for each of the desired operations. Thus, electric motorization for the raising the lowering of the side windows of a vehicle has already been proposed.

SUMMARY OF THE INVENTION

This invention has as its object a device for alternately electrically driving two operations with a single gearmotor.

For this purpose, the invention proposes a gearmotor having a housing which receives a drive pinion mounted on the output shaft of the reduction gear. The drive pinion is able to alternately engage with a first rack cable and a second rack cable, both mounted substantially parallel in a sliding guide that can move inside the housing, in a plane perpendicular to the shaft of the drive pinion, between two end positions in each of which one of the two cables is engaged with the drive pinion while the other cable is in a disengaged position, and a device for actuating the sliding guide.

To keep the sliding guide in one of its two end positions without risk of untimely movements thereof, the sliding guide is mounted to slide in the housing and is equipped with an actuating pin that extends outside the housing to cooperate with the actuation device which consists of a cam mounted to rotate on the housing. The cam profile cooperates with the actuating pin. An actuator drives the cam in rotation.

DETAILED DESCRIPTION OF THE PREFERRED EMBODIMENT

Figure 5:
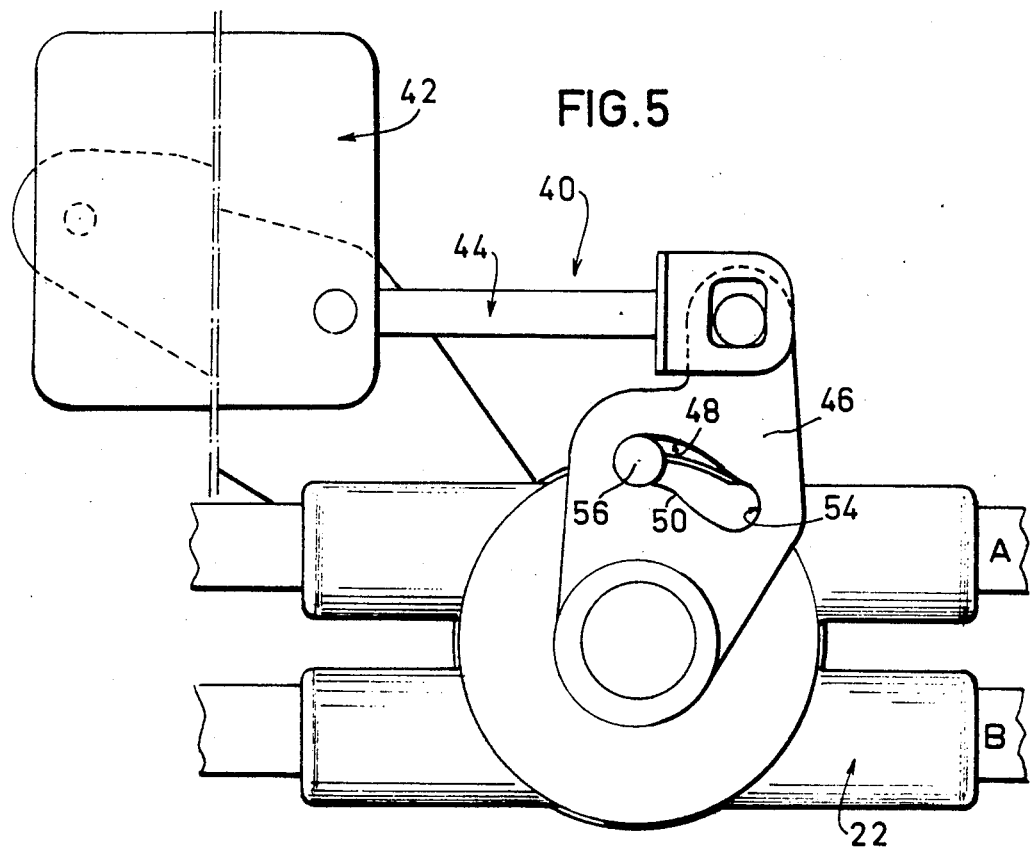
FIG. 5 is an external view showing the cam for controlling the movement of the sliding guide, shown in the position corresponding to that of FIG. 3.
Figure 1:
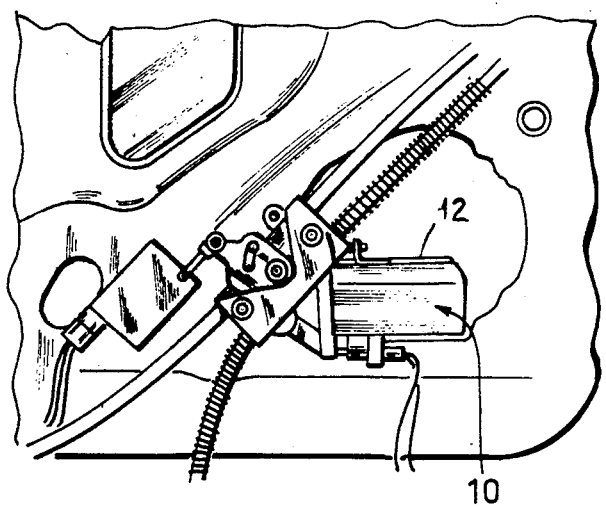
FIG. 1 is a general view showing a gearmotor according to the invention on the frame of a motor vehicle door.

A gearmotor assembly 10 has an electric motor 12 whose pinion 14 cooperates with an input pinion 16 of the reduction gear. Input pinion 16 of the one-stage reduction gear is mounted on output shaft 18 on which toothed drive pinion 20 is also mounted.

Output shaft 18 is mounted to rotate in housing 22 of gearmotor assembly 10.

According to the invention, drive pinion 20 is able to alternately engage with a first rack cable A and a second rack cable B. The rack cables used in this embodiment are of a known type consisting of a helically threaded cable guided rigidly by pulling and compression in a guide tube 24 and 26 respectively.

Figure 3:
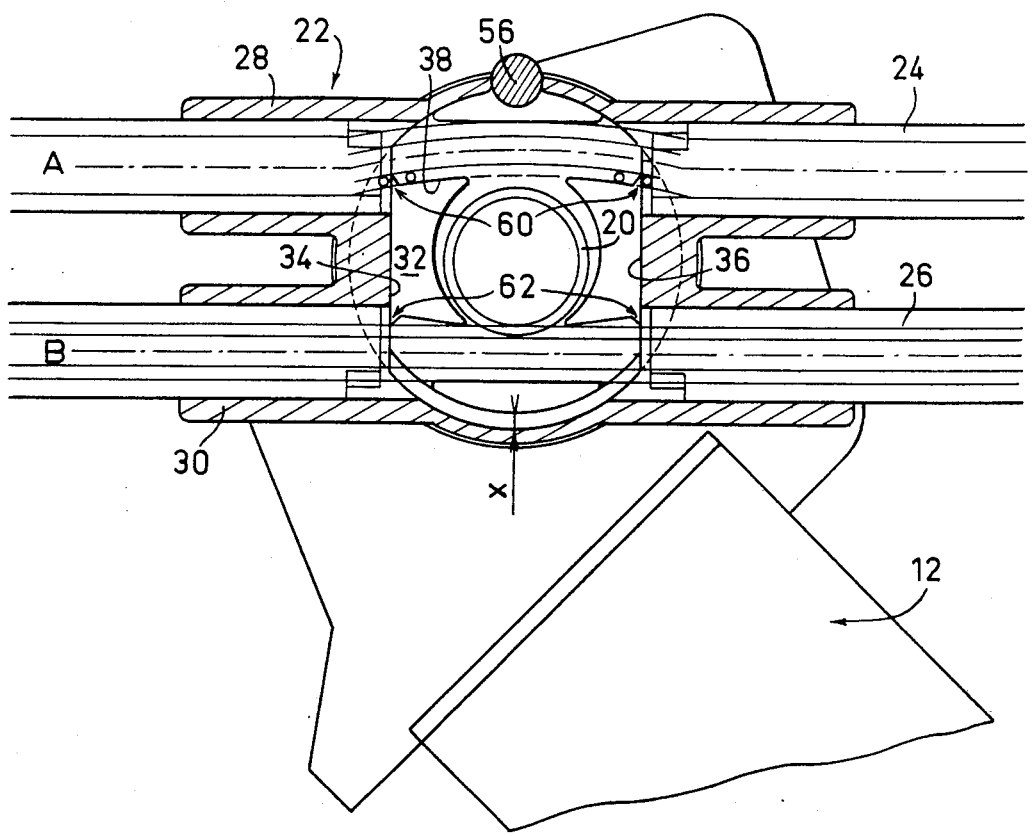
FIG. 3 is a section of the gearmotor along line 3—3 of FIG. 2, the lower cable being shown in an engaged position.
Figure 4:
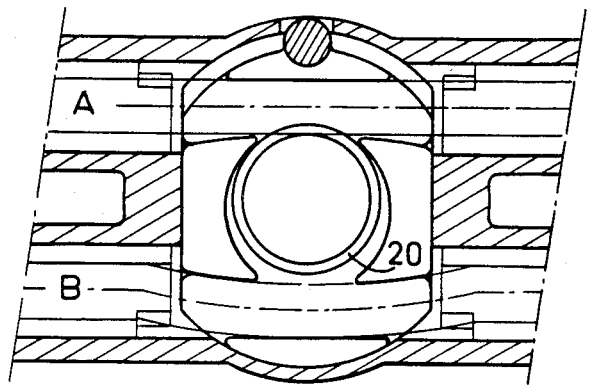
FIG. 4 is a partial view similar to that of FIG. 3 in which the upper cable is shown in an engaged position.

As can be seen in FIGS. 3 and 4, guide tubes 24 and 26 of rack cables A and B are mounted in parallel guide channels 28 and 30 in case 22.

Rack cables A and B are thus able to move substantially in parallel inside housing 22 under the action of driving pinion 20. To assure the alternate driving of one or the other of rack cables A and B, the latter are mounted in parallel in a part forming a sliding guide 32 which is mounted to slide in housing 22.

The sliding guide 32 is in the form of a disc having a central aperture through which the drive pinion 20 extends, and having flats facing faces 34 and 36 of housing 22. The racks A and B extend through slightly arcuate bores in the sliding guide, the bores intersecting the central aperture to permit the drive pinion 20 to engage one or the other of the rack cables. The guiding of sliding guide 32 is assured by the two parallel faces 34 and 36 in housing 22 so as to make a movement of sliding guide 32 possible only in a plane perpendicular to shaft 18 of drive pinion 20 and in a direction perpendicular to the common parallel direction of movement of cables A and B. As can be seen in FIGS. 3 and 4, in which sliding guide 32 is shown, on the one hand, in high position and, on the other hand, in low position, this sliding guide can move a distance X indicated in FIG. 3. This movement of sliding guide 32 makes it possible to alternately engage and disengage one of the two cables A or B from drive pinion 20.

For example, in FIG. 3, where the sliding gulde is in a high position, lower cable B is in an engaged position while upper cable A is in a disengaged position in which its helical thread is no longer meshed with the teeth of drive pinion 20, thanks to a slight curved deformation of the cable obtained by the corresponding profile 38 of the bore of the sliding guide. In a symmetrical manner, in FIG. 4, upper cable A is in engaged position, sliding guide 32 being in its low position.

To assure the actuation of the sliding guide to cause it to alternately occupy its two end positions, the gearmotor according to this invention includes an actuating device 40.

Figure 6:
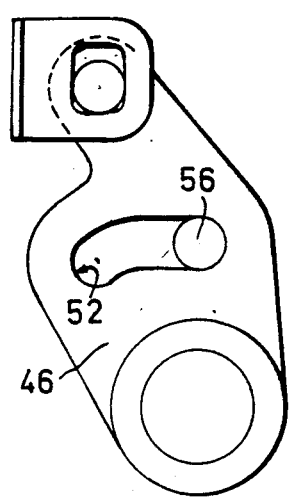
FIG. 6 is a partial view, similar to that of FIG. 5, showing the cam in the position corresponding to the one shown in FIG. 4.
Figure 2:
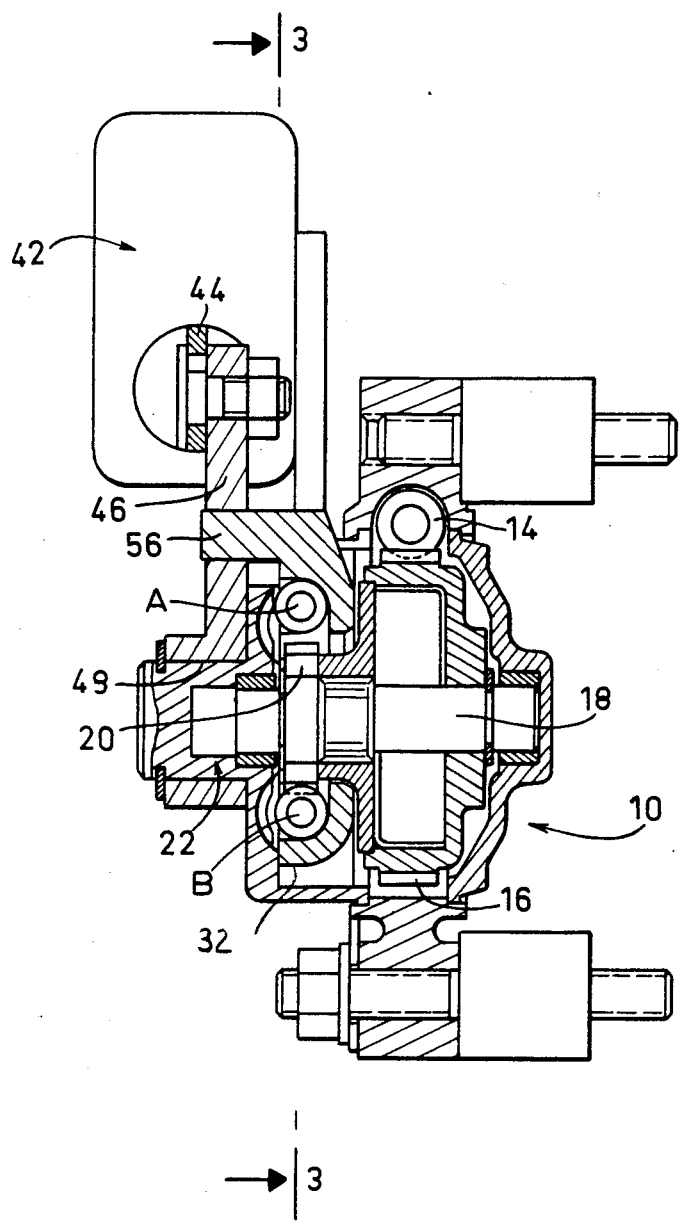
FIG. 2 is a cross section of the gearmotor of FIG. 1.

Actuating device 40 has an electric actuator 42 whose output rod 44 is able to move lengthwise and alternately from left to right, looking at FIGS. 5 and 6, to drive in rotation a cam 46 mounted to rotate on a cylindrical portion 49 of housing 22, coaxial with output shaft 18 of this reduction gear.

Cam 46 is provided with a cam profile slot 48 which has approximately the shape of a kidney and whose curvilinear portion, centered on the axis of rotation of the cam, has a deflection 50 having a radial component so that the two ends 52 and 54 of the curvilinear portion which define the end positions occupied by the sliding guide are located at two different radii of the cam.

Cam 46 cooperates with an actuating pin 56 which is fixed to sliding guide 32 and which extends outside housing 22 to engage cam profile 48 of cam 46 of actuating device 40.

As can be seen in FIGS. 5 and 6, the rotation of cam 46 between its two end positions under the action of electric actuator 42 has the effect of causing vertical (radial) movements of pin 56 by a distance X corresponding to the difference between the two radii of the cam ends 52 and 54.

According to another aspect of the invention, sliding guide 32 has means that make it possible to immobilize in translation the one of the two rack cables which is in a disengaged position. These means actually aim at preventing any axial movement of the cable when in a disengaged position, particularly under the tension of the element for which it provides actuation.

These immobilization means consist of two pairs of teeth 60 and 62 made on sliding guide 32 and which alternately engage with the helical thread of the cable which is in a disengaged position.

The electric control device for actuator 42 and for electric motor 12 has not been shown and will not be described since conventional devices may be used; however, it will be noted that it is desired that this control device have a time delay system so as to assure a time-delayed in feeding of actuator 42 in relation to electric motor 12 so as to enable one of the cables to disengage before causing the actuation of the other cable by the motor.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A gearmotor for the alternate drive of two operations, comprising:
    a housing;
    a drive pinion rotatably mounted in said housing;
    first and second substantially parallel rack cables extending through said housing in a first direction perpendicular to an axis of rotation of said drive pinion and on respectively opposite sides of drive pinion;
    sliding guide means for guiding said first and second rack cables, said sliding guide means being movable in said housing only in a second direction perpendicular to said axis of rotation and to said first direction by an amount sufficient for said drive pinion to alternately engage one of said first and second rack cables; and
    means for moving said sliding guide means comprising sliding guide means actuator means, and an actuating pin fixed to said sliding guide means, said pin extending outside of said housing and engaging said actuator means.

2. The gearmotor of claim 1 wherein said actuator means comprise:
    a cam rotatable about said drive pinion axis; and
    means for rotating said cam, wherein a cam profile of said cam operatively engages said actuating pin.

3. The gearmotor of claim 2 wherein said cam profile has a radial component, whereby said actuating pin is moved in said second direction.

4. The gearmotor of claim 1 wherein said sliding guide means includes means for axially fixing one of said first and second rack cables which is not engaged by said drive pinion.

5. The gearmotor of claim 4 wherein said means for axially fixing comprises tooth means on said sliding guide means for engaging a first portion of said one of said rack cables.

6. The gearmotor of claim 5 wherein said first portion comprises a helical thread.

* * * * *

UNITED STATES PATENT AND TRADEMARK OFFICE
CERTIFICATE OF CORRECTION

PATENT NO. : 4,691,581

DATED : September 8, 1987

INVENTOR(S) : Jacques Bascou

It is certified that error appears in the above-identified patent and that said Letters Patent is hereby corrected as shown below:

Title page:

Priority information is deleted from Letters Patent. Should read as follows:

- Dec. 7, 1984 [FR] France .......... 84 18 686 -

Signed and Sealed this

Twenty-third Day of February, 1988

*Attest:*

DONALD J. QUIGG

*Attesting Officer*   *Commissioner of Patents and Trademarks*